United States Patent [19]

Dennis et al.

[11] 4,346,465
[45] Aug. 24, 1982

[54] AUTOMATIC RECORD PLAYER

[75] Inventors: James T. Dennis, P.O. Box 15100, Oklahoma City, Okla. 73155; George Kolomayets, Chicago, Ill.

[73] Assignee: James T. Dennis, Oklahoma City, Okla.

[21] Appl. No.: 211,837

[22] Filed: Dec. 1, 1980

Related U.S. Application Data

[60] Division of Ser. No. 9,254, Feb. 5, 1979, Pat. No. 4,291,886, which is a continuation of Ser. No. 813,225, Jul. 5, 1977, abandoned.

[51] Int. Cl.$^3$ .................. G11B 17/06; G11B 19/06
[52] U.S. Cl. ..................................... 369/230; 369/225
[58] Field of Search ............... 369/225, 226, 230, 217, 369/210, 211

[56] References Cited

U.S. PATENT DOCUMENTS 2,366,858  1/1945  Knox et al. ........................ 369/230
3,218,078  11/1965  Freier ................................. 369/217

Primary Examiner—Steven L. Stephan
Attorney, Agent, or Firm—Mason, Kolehmainen, Rathburn & Wyss

[57] ABSTRACT

An extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is moved or restrained during the record changing cycle.

The control knob normally used for ON-OFF-REJECT functions, is provided with a 4th position in which the record changer repeatedly plays a record on the turntable without shutting off the machine. This REPEAT PLAY position is reached by first moving the control knob to the ON or REJECT position and then moving it back to a position between the ON and OFF positions. When so moved, a detent force is provided for the control knob and an audible click is produced to inform the operator that the REPEAT PLAY position has been reached.

13 Claims, 8 Drawing Figures

Fig 1

AUTOMATIC RECORD PLAYER

The present invention is a division of my copending application Ser. No. 009,254, filed Feb. 5, 1979, now U.S. Pat. No. 4,291,886, which is itself a continuation of parent application Ser. No. 813,225, filed July 5, 1977, now abandoned.

The present invention relates to record changers and more particularly, to automatic record changers which are arranged to play a series of phonograph records in the order in which the records are placed on the centering spindle of the record changer.

Present day automatic record changers are much too complicated and expensive to manufacture. For example, the changer manufactured by BSR Ltd., which changer constitutes approximately eighty percent of the total world's production of automatic record changers, has approximately 220 parts and requires a substantial amount of labor to assemble and test these parts in order to manufacture the complete record changer. In addition, most, if not all, present day automatic record changers are sensitive to warpage and bending of the metal base plate on which the parts of the record changer are assembled. This base plate is conventionally made of relatively thin sheet metal and the tone arm driving and positioning mechanisms become misaligned and malfunction when warpage or bending of the base plate occurs, either in production, during shipping, or after the changer has been used by the customer. Furthermore, because the functions at the center of the turntable are interconnected with the functions at the tone arm mechanism by means of complicated linkages, and the like, it is not possible to separately test and align the tone arm assembly before it is assembled in the main base plate. Accordingly, the manufacturing cost of such arrangements is substantially increased. Also, in order to properly position the tone arm over the rest post of the changer, most conventional changers require indexing means associated with the tone arm quadrant for stopping the tone arm over the rest post and lowering it onto the rest post during the last record shutoff cycle. However, such arrangements are also sensitive to warpage and bending of the base plate which tends to misalign the portion of the base plate containing the rest post with respect to the area at which the tone arm is rotatably mounted.

It is, therefore, a primary object of the present invention to provide a new and improved automatic record changer wherein one or more of the above discussed disadvantages of prior art arrangements is avoided.

It is another object of the present invention to provide a new and improved automatic record changer which is relatively insensitive to warpage and bending of the base plate of the changer.

It is a still further object of the present invention to provide a new and improved automatic record changer wherein positioning of the tone arm over the rest post during the last record shutoff cycle is relatively insensitive to warpage and bending of the base plate or misalignment of parts.

It is another object of the present invention to provide a new and improved automatic record changer wherein the tone arm is positioned during a last record shutoff cycle by physical engagement with a portion of the rest post, this engagement functioning accurately to register the tone arm for subsequently lowering into engagement with the rest post.

It is a still further object of the present invention to provide a new and improved automatic record changer wherein the tone arm is positioned over the rest post and lowered into retained engagement therewith somewhat before mid cycle of a last record shutoff cycle, the tone arm driving mechanism having a slip clutch arrangement to permit such retained engagement at mid cycle.

It is a further object of the present invention to provide a new and improved automatic record changer wherein the tone arm mechanism is mounted on a separate subassembly which is interconnected with the main cycling gear of the changer by means of only two members for lifting and driving the tone arm, the positioning of which is relatively insensitive to warpage and bending of the base plate.

It is a further object of the present invention to provide a new and improved tone arm subassembly for use in automatic record changers which may be manufactured as a separate item and aligned mechanically and electrically checked before it is assembled into the main base plate of the changer.

Briefly, in accordance with the present invention an extremely simple record changer mechanism is provided wherein only two members interconnect the tone arm subassembly with the main cycling gear in the spindle area of the changer. One of these members is employed to lift and lower the tone arm and the other member is used for the dual purpose of moving the tone arm horizontally during the record changing cycle and also acts as a velocity trip actuating member during the playing cycle. Both members are designed to avoid damage to the mechanism if the tone arm is accidentally moved or restrained during the record changing cycle.

The invention both as to its organization and method of operation, together with further objects and advantages thereof, will best be understood by reference to the following specification taken in connection with the accompanying drawings.

Figure 1:
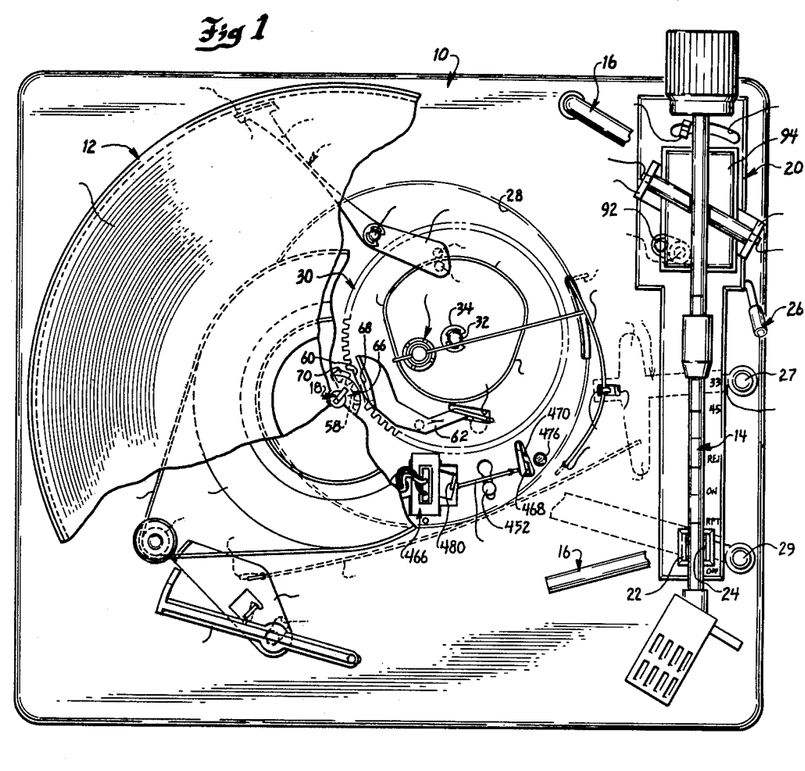
FIG. 1 is a top plan view of the record changer of the present invention with a portion of the turntable broken away to show a portion of the record changing mechanism.

Referring now to the drawings, and more particularly to FIG. 1 thereof, the automatic record changer of the present invention is therein illustrated as comprising a metal base plate indicated generally at 10 on which is mounted a rotatable turntable indicated generally at 12, a tone arm indicated generally at 14, and a balance arm indicated generally at 16. The turntable 12 is mounted for rotation about a centering spindle indicated generally at 18 on which a stack of records may be supported and the balance arm 16 moved from its rest position somewhat beyond the position shown in FIG. 1 to a position over the records so that these records are balanced on the record supporting shelf of the spindle 18.

The tone arm 14 is rotatably mounted on a tone arm housing subassembly indicated generally at 20, the housing 20 being provided with a rest post portion 22 which extends upwardly from the housing 20 and is provided with a relatively deep notch 24 in the top thereof within which the tone arm 14 may be seated when the record changer is turned off. A cueing lever indicated generally at 26 is rotatably mounted in the tone arm subassembly 20.

The base plate 10 is provided with a central depressed portion 28. Most of the parts of the record changing mechanism per se are mounted on the top and bottom of the central depressed base plate portion 28, which is eccentric with respect to the spindle 18 to permit such mounting, thereby eliminating the conventional base plate subassemblies which are normally employed to mount the operative parts of the record changing mechanism. By employing the central base plate portion 28 as a support for the control levers and other parts of the record changing mechanism, the number of parts required is substantially reduced and in addition the amount of time required to assemble these parts in production is also substantially reduced. More particularly, a cycling gear indicated generally at 30 is rotatably mounted on a post 32 which is secured in the central base plate portion 28 and extends upwardly therefrom, the gear 30 being retained on the post 32 by any suitable means such as the C washer 34.

In order to drive the main cycling gear 30 during the record changing cycle, the turntable hub is provided with pinion gear teeth 58 at the bottom end thereof which are adapted to engage the peripheral gear teeth of the gear 30. However, during the playing cycle the gear 30 is detented in a home position in which a mutilated portion 60 of the gear 30 is opposite the gear teeth 58 so that these teeth are not in mesh during the playing cycle.

In order to initiate a record changing cycle, a single velocity trip lever 62 (FIG. 1) is pivotally mounted on the upper face of the gear 30, the lever 62 being provided with an upstanding flange portion 66 (FIG. 1) in which a vertically extending shoulder 68 is formed. The shoulder 68 is arranged to be struck by a flange 70 provided on the central sleeve portion of the turntable hub 38 above the gear 58 when the shoulder portion 66 of the velocity trip lever 62 is moved inwardly by a predetermined amount. Movement of the velocity trip lever 62 is effected at the end of the playing cycle by means of a velocity tripping mechanism. As soon as the velocity trip lever 62 has been pivoted by an amount sufficient to bring the shoulder 68 into the path of the flange 70, the gear 30 is rotated by engagement of these members by an amount such that the gear teeth of the turntable hub gear 58 engage the adjacent teeth of the gear 30 and rotate the gear 30 through one revolution during the record changing cycle.

Considering the manner in which the tone arm 14 is lifted off of a record on the turntable 12 at the beginning of the record changing cycle, a tone arm lift rod indicated generally at 72 (FIG. 3) is provided with a right angle end portion 74 which is mounted in spaced apart bearings in the tone arm subassembly 20. More particularly, the tone arm subassembly 20 includes a main housing 76 which is provided with a pair of downwardly extending posts 78 and 80. A plate 82 is mounted on the posts 78 by means of the screws 84 and 86 (FIG. 22). The housing 76 includes an upstanding portion 88 which is provided with a vertically extending bore 90 which is adatped to receive the upper end of the right angle portion 74 of the tone arm lift rod 72. The upper end of the bore 90 is arranged to form a bearing for the upper end of the right angle portion 74 and the plate 82 forms a lower bearing for this right angle end portion 74. As a result, the lift rod 72 is supported by these two spaced apart bearings so that it may be smoothly raised and lowered. The upper end of the right angle end portion 74 is threaded and an adjustable cap 92 is threaded onto the upper end of the right angle end portion 74, the cap 92 being arranged to engage the undersurface of a flat plate portion 94 of the tone arm 14.

Figure 7:
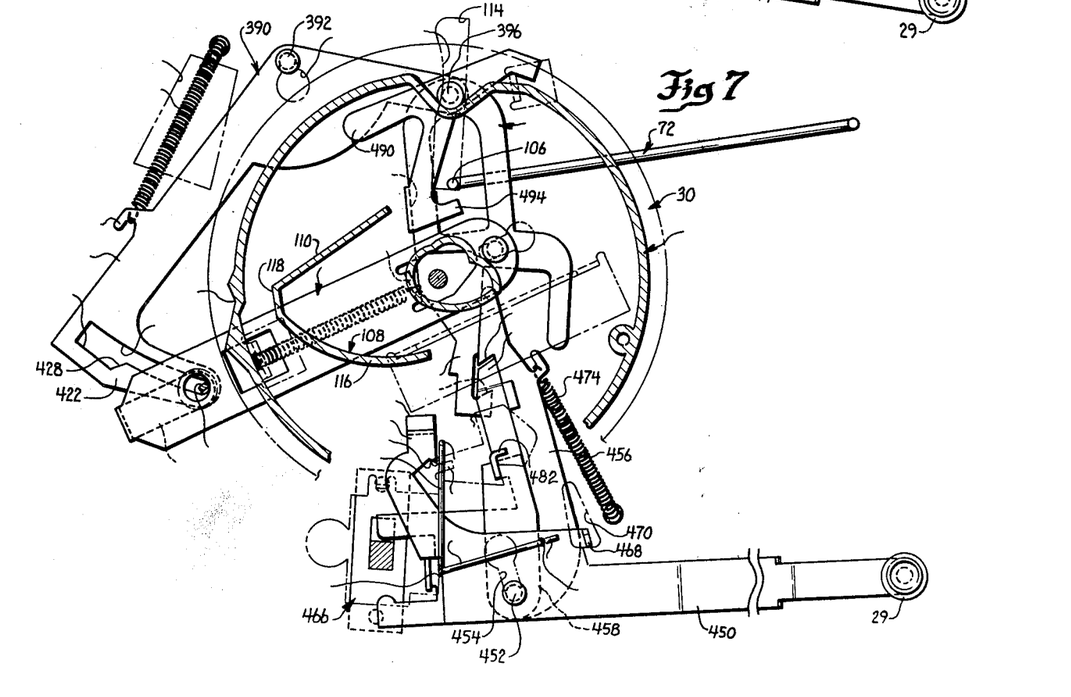
FIG. 7 is a view similar to FIG. 6 but showing the control knob in the ON position and the main cam in a last record shutoff cycle initiating position.
Figure 8:
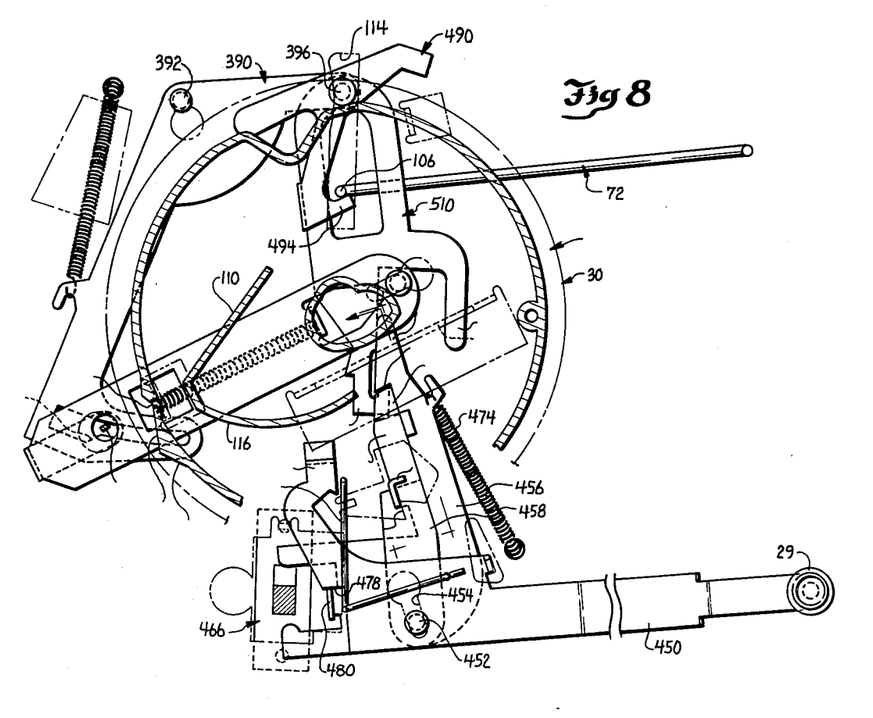
FIG. 8 is a view similar to FIG. 7 but showing the main cam during a last record shutoff cycle.

The plate 82 is provided with a downwardly extending offset flange portion 96 which has an inclined camming surface 98 formed in the bottom edge thereof. The tone arm lift rod 72 is biased upwardly into engagement with the camming surface 98 by means of a coil spring 100 the bottom end of which is hooked around the tone arm lift rod 72. The spring 100 extends upwardly through an opening 102 (FIG. 22) formed in the plate 82 and into the interior of an upwardly extending housing 104 formed in the plate 82. The upper end of the spring 100 is secured to the top wall of the housing 104. The other end of the lift rod 72 is provided with a right angle end portion 106 which is biased into engagement with a depending cam indicated generally at 108 (FIG. 7), which is formed in the bottom surface of the gear 30, this biasing force being achieved by virtue of the upward force exerted by the spring 100 adjacent the inclined camming surface 98 which tends to rotate the end portion 106 of the lift rod 72 toward the center of the gear 30.

Figures 2, 3:
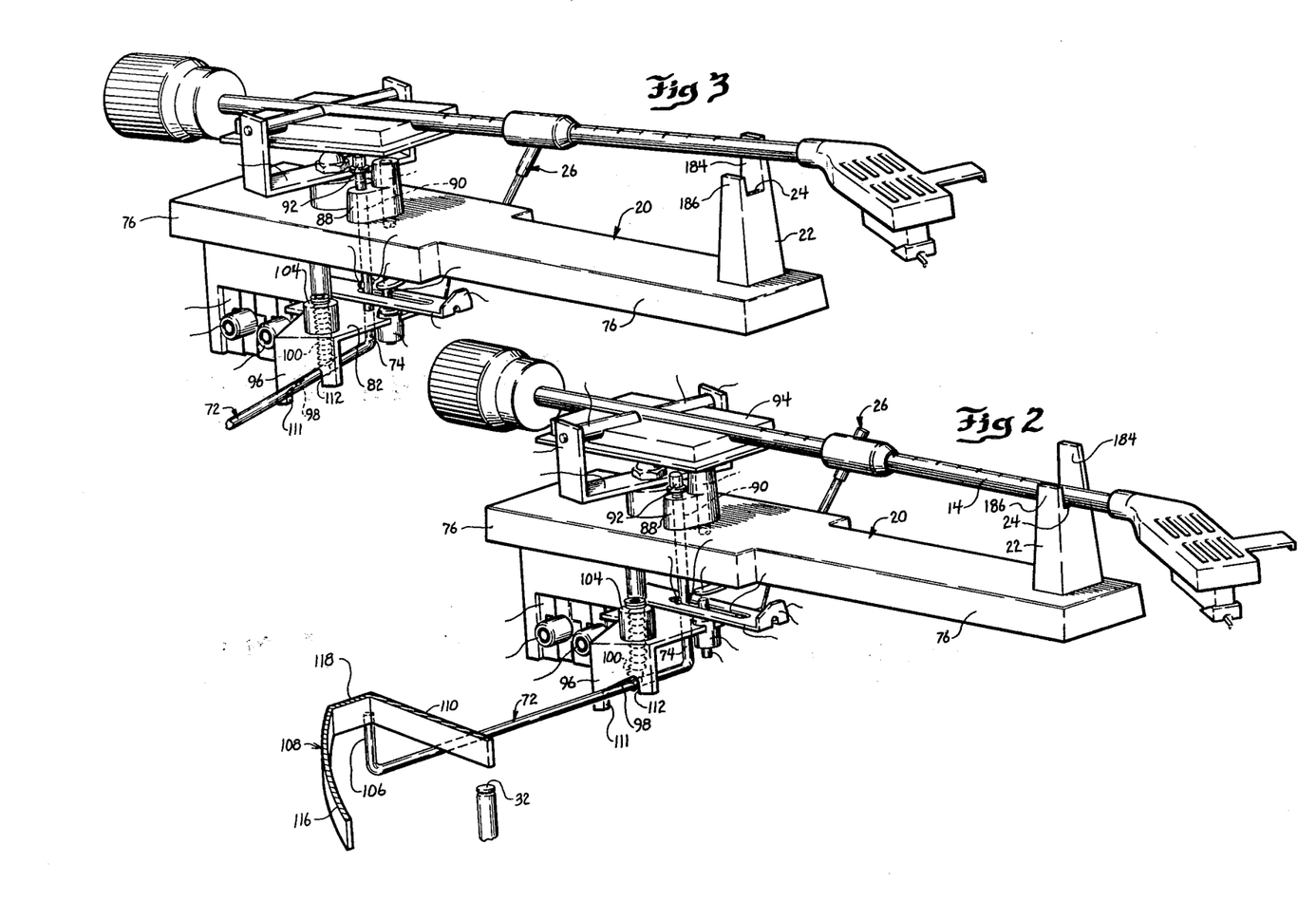
FIG. 2 is a perspective view of the tone arm subassembly of the changer of FIG. 1 when the changer is turned off.
FIG. 3 is a view similar to FIG. 2 but showing the position of the tone arm near the end of a last record shutoff cycle.
Figure 4:
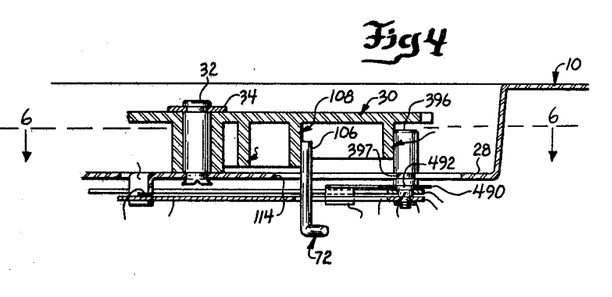
FIG. 4 is a fragmentary sectional view taken along a line through the center of the main cycling gear of the change of FIG. 1.
Figure 5:
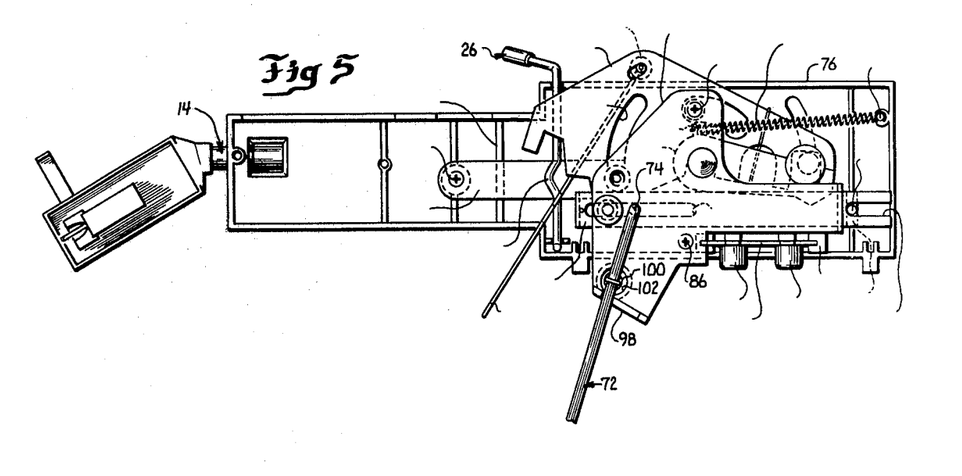
FIG. 5 is a bottom view of the tone arm subassembly of FIG. 3.
Figure 6:
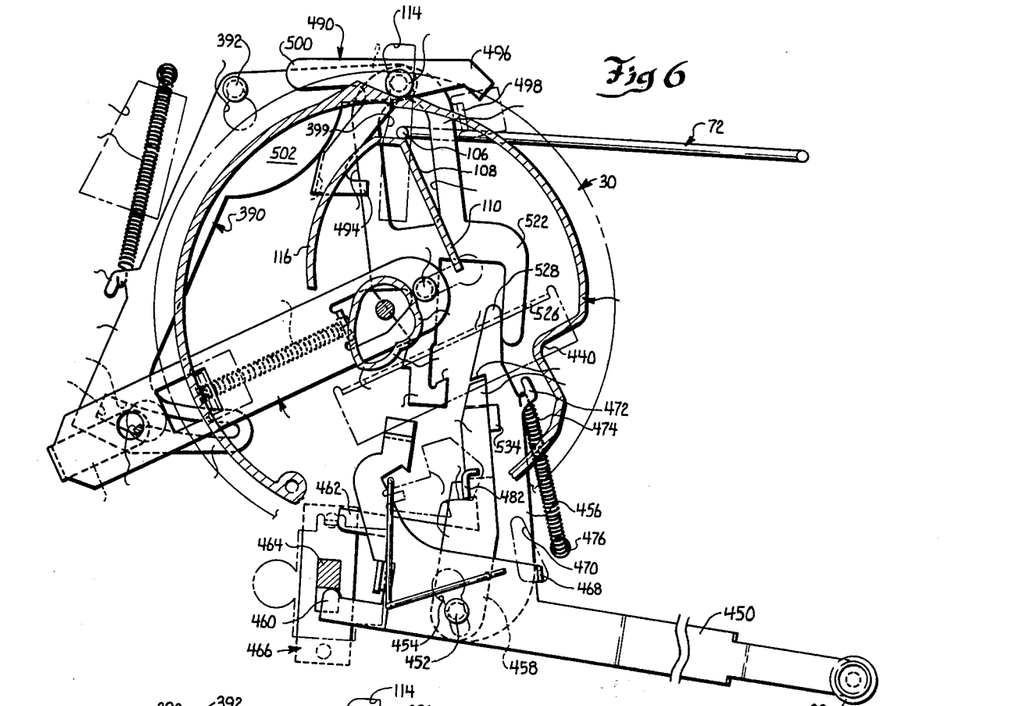
FIG. 6 is a fragmentary sectional view taken along the line 6—6 of FIG. 4 and showing the control knob of the changer of FIG. 1 in the OFF position.

When the gear 30 starts to rotate at the beginning of the record changing cycle the end portion 106, which is continuously biased into engagement with the cam 108 by virtue of the twisting action produced by the upward force of the spring 100 in relation to the inclined camming surface 98, follows the portion 110 of the cam 108 with the result that the lift rod 72 is pivoted about the above-described bearings for the end portion 74 thereof. However, since the spring 100 is continuously urging the lift rod 72 upwardly, as this rod is rotated it is also bodily lifted upwardly as it rides along the cam surface 98. Accordingly, the end portion 106 may be rotated by an amount sufficient to permit the lift rod 72 to be lifted up to the position shown in FIG. 4 wherein the portion 106 of the rod 72 engages the end of the slot 114 (FIG. 26) in the base plate 10. The flange 96 is also provided with stops 111, 112 at either end of the cam surface 98 to limit movement of the rod 72 during assembly. As this upward movement of the lift rod 72 occurs, the cap 92 on the upper end of the end portion 74 of the lift rod engages the plate 94 and lifts the tone arm upwardly off of the record which has just been played on the turntable 12. In this connection it should be noted that the tone arm 14 is shown in FIGS. 3 and 4 in a position over the rest post 22. However, a similar lifting action is provided by the lift rod 72 when the tone arm 14 is resting on a record seated on the turntable 12.

The end portion 106 of the lift rod 72 extends upwardly through a slot 114 (FIG. 7) formed in the base plate 10 so that the upper portion of the end portion 106 may be biased into engagement with the cam 108 as described heretofore. The spring 100 maintains the lift rod 72 in an elevated position after the end portion 106 has been moved out of engagement with the cam portion 110 so that the tone arm remains in an elevated position during the portion of the record changing cycle during which the next record is being deposited on the turntable and the tone arm is moved inwardly to the correct record size position. However, near the end of the record changing cycle the end portion 106 of the lift rod 72 engages the cam portion 116 of the cam 108. The cam portion 116 is not as steep as the cam portion 110 and hence the tone arm is gently lowered to the surface of the record on the turntable 12 as the end portion 106 is engaged by the cam portion 116 and moved outwardly and the lift rod 72 is cammed down the surface 98 against the force of the spring 100. Very close to the end of the record changing cycle the end portion 106 engages an intermediate portion 118 of the cam 108. The portion 118 is formed along an arc having the center of the gear 30 as its center so that the biasing force which is exerted by the end portion 106 on the cam 108 and hence the gear 30, is constant and minimized as the gear 30 approaches its home or detent position. In this connection it will be noted that the end portion 106 moves upwardly relative to the cam portion 110 as the lift rod is bodily moved upwardly at the beginning of the record changing cycle. Also the end portion 106 is moved downwardly relative to the cam portion 116 as the tone arm is lowered. However, no upward or downward movement of the end portion 106 relative to the cam portion 118 is experienced as the end portion 106 traverses the cam portion 118 so that minimal forces are exerted on the gear 30 as it approaches the detent position. In this connection it will be noted that raising and lowering of the tone arm 14 is achieved solely in response to rotation of the end 106 of the lift rod 72 as controlled by the cam 108 so that an extremely simple and yet efficient and smoothly acting tone arm lift arrangement is provided in accordance with the present invention. Furthermore, it is pointed out that the amount of lift is determined at the tone arm subassembly 20 by the cam surface 98 and warpage of the base plate does not change the height of the tone arm lift as it would with conventional linear motion slides which are directly connected to the main cycling gear. It is also pointed out that the lift rod 72 functions smoothly with relatively little force because the cam surface 98 is positioned quite a distance from end portion 74 about which the rod 72 pivots. This construction permits the cam surface 98 to have a gradual slope, whereas if this cam were placed close to the end 74 it would have to be relatively steep and substantial additional force would be required to move along it. However, the cam surface 98 can be spaced away from the end 74 only because spaced apart bearings are provided for the end 74, as described heretofore, so that the rod 72 may be lifted smoothly and with little force exerted thereon.

Considering now the control linkage which is employed to turn on and off the motor manually, a control knob 29 is connected to the end of an on-off lever 450 (FIG. 25) which is rotatably mounted on a pin 452. The pin 452 is itself connected to a switch actuating plate 456 which is positioned below the lever 450. The pin 452 is provided with a groove which rides in the narrow portion of a keyhole slot 454 formed in the base plate portion 28. A flat spring blocking member 458 is positioned between the lever 450 and the plate 456 and is secured to the pin 452. More particularly, the pin 452 is provided with a first portion 453 of reduced diameter on which the on-off lever 450 is pivotally mounted. The pin 452 is also provided with a portion 455 of still smaller diameter which defines a shoulder 457 against which the blocking member 458 and switch actuating plate 456 are held by staking the end of the pin 452 so that the members 452, 456 and 458 move together. The plate 456 carries a pair of switch actuating arms 460 and 462 which are positioned on either side of the actuating button 464 of a slide switch indicated generally at 466. The on-off lever 450 is provided with an upwardly extending tongue portion 468 which extends into a triangularly shaped opening 470 in the base plate portion 28. The switch actuating plate 456 is provided with a projecting lug portion 472 to which one end of a spring 474 is connected, the other end of the spring 474 being connected to an opening 476 (FIG. 1) in the base plate portion 28. The on-off lever 450 is provided with a shoulder 478, FIG. 27 which is normally held in engagement with an upturned flange portion 480 on the switch actuating plate 456. In the OFF position of the control knob 29 the spring 474 functions to rotate the plate 456 so that the flange 480 thereof is in engagement with the shoulder 478 and the lever 450 is also rotated until the tongue 468 hits one end of the slot 470. In the OFF position of the plate 456 the arm 460 retains the switch button 464 of the switch 466 in the OFF position shown in FIG. 25.

Considering now the automatic shut-off mechanism which cooperates with the above-described on-off control linkage to turn off the machine when the detent pin 396 enters the notch 440 in the control cam 402, it is first noted that this shut-off action is accomplished during the same record changing cycle during which the absence of a record on the shelf of the spindle 18 is detected during the sensing portion of the record changing cycle. As described generally heretofore, the tone arm 14 is moved outwardly during the record changing cycle until it strikes the back wall 184 of the tone arm rest post 22, during the mid portion of the record changing cycle. In accordance with an important feature of the present invention the tone arm is lowered during the period when it is in engagement with the back wall 184 of the rest post 22 so that the tone arm is lowered into the notch 24 during the mid portion of the last record shut-off cycle. Furthermore, the tone arm remains in this somewhat lowered position during the remainder of a last record shut-off cycle so that the tone arm is now moved back inwardly as the gear 30 rotates back to its detent position.

In order to lower the tone arm to an intermediate position within the rest post notch 24 after the tone arm has engaged the back wall 184, a tone arm latch member indicated generally at 490 (FIG. 25) is pivotally mounted on the detent pin 396. More particularly, the detent pin 396, which is staked to the detent lever 390 is provided with a shoulder portion 492 (FIG. 7) on which the tone arm latch 490 is pivotally mounted, the latch 490 being preferably made of thin spring stock, or the like. The tone arm latch 490 is provided with an inwardly extending hook portion 494 (FIG. 25) and an extension arm portion 496 which is adapted to engage a downturned flange portion 498 of the base plate portion 28 when the detent pin 396 enteres the notch 440. The tone arm latch 490 is also provided with an arm portion 500 which rides on the surface 502 of the detent lever 390 to stabilize the tone arm latch 490 during pivotal movement thereof.

As described generally heretofore, during the first portion of the record changing cycle the tone arm lift rod 72 is moved inwardly as the end 106 thereof follows the cam portion 110 on the gear 30. However, as the detent pin 396 enters the notch 440 the hook portion 494 of the tone arm latch 490 is moved inwardly to a point inside the end portion 106 of the lift rod 72 and as the arm 496 of the tone arm latch 490 engages the flange 498 the tone arm latch 490 is pivoted so that the hook portion 494 thereof is in alignment with the lift rod end portion 106 as shown in FIG. 26. Accordingly, as the detent pin 396 moves out of the notch 440 to the position shown in FIG. 27 the hook portion 494 engages the lift rod end portion 106 and moves it outwardly to the intermediate position shown in FIG. 27. At this point in the record changing cycle, the tone arm 14 has already been lifted from the record and moved outwardly into contact with the back wall 184 of the rest post 22. Accordingly, when the lift rod end portion 106 is moved outwardly by engagement with the hook portion 494 of the tone arm latch 490 the tone arm is immediately lowered into the notch 24 in the rest post 22. The detent pin 396 continues to ride on the periphery of the control cam 402 with the result that the latch 490 holds the lift rod 72 in the position shown in FIG. 27 until the end portion 106 of the rod 72 is engaged by the cam portion 116 near the end of the record changing cycle. When the end portion 106 engages the cam 116 the tone arm lift rod 72 is moved further down the inclined camming surface 98 and the end portion 74 thereof is lowered while the tone arm remains in the notch 24 of the rest post 22.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a record player, the combination of a tone arm, means for mounting said tone arm for rotation about a fixed point, a tone arm lift rod having a generally horizontal intermediate portion and a right-angle portion at one end thereof, bearing means for mounting said right-angle end portion for rotation about a vertical axis, means defining a shoulder positioned above and extending generally transversely of said intermediate portion and spaced from said right-angle end portion, means for biasing said intermediate portion upwardly into engagement with said shoulder, said shoulder being inclined with respect to the horizontal, means adapted to engage the other end of said lift rod and control rotation thereof and vertical movement of said right angle end portion in response to the force exerted thereon by said biasing means, and means responsive to said vertical movement of said right angle end portion for producing a corresponding vertical movement of said tone arm.

2. The combination of claim 1, which includes a main cycling gear, means for rotating said gear one revolution during an automatic cycle, and tone arm lift cam means on said gear, said other end of said lift rod being held in engagement with said tone arm lift cam means by said biasing means so that rotation of said lift rod is controlled by said tone arm lift cam means as the gear rotates during an automatic cycle.

3. In an automatic record player, the combination of, a tone arm, means for mounting the tone arm for rotation about a fixed point, a main cycling gear, means for rotating said gear one revolution during an automatic cycle, cam means on said main cycling gear, a tone arm lift rod having a horizontal portion one end of which is in engagement with said cam means and the other end of which is connected to a right-angle end portion, bearing means for mounting said right-angle end portion for rotation about a vertical axis, said right-angle end portion being positioned so that movement thereof along said vertical axis raises and lowers said tone arm, means defining a shoulder positioned above and extending generally transversely of said horizontal portion of said lift rod and spaced from said right-angle end portion, means for biasing said lift rod upwardly into engagement with said shoulder, said shoulder being inclined with respect to the horizontal so that said biasing means tend to rotate said horizontal portion about said bearing means and move said right-angle end portion along said vertical axis, said biasing means also acting to bias said one end of said horizontal portion into engagement with said cam means, said cam means controlling rotation of said horizontal portion about said bearing means and vertical movement of said right-angle end portion during an automatic cycle.

4. The combination of claim 3, which includes a cam on said gear and having a notch therein, a pivotally mounted cam follower member, means for biasing said follower member into engagement with said cam, means operative during an automatic shutoff cycle and responsive to movement of said cam follower out of said notch for rotating said lift rod in the direction to lower said right angle end portion, thereby to lower said tone arm during said automatic shutoff cycle.

5. A record player according to claim 4, wherein said tone arm is lowered during the mid portion of said automatic shutoff cycle.

6. A record player according to claim 4, which includes a tone arm rest post, said tone arm being lowered into engagement with said rest post during the mid portion of said automatic shutoff cycle.

7. A record player according to claim 3, wherein said gear includes a second cam having a notch therein, a pivotally mounted cam follower biased into engagement with said second cam, and means operative independently of said tone arm lift cam during an automatic shutoff cycle and responsive to movement of said cam follower out of said notch for engaging said lift rod and rotating the same in the direction to lower said right angle end portion, thereby to lower said tone arm during said automatic shutoff cycle.

8. The record player of claim 3, wherein said means for biasing said lift rod is connected to said horizontal portion of said lift rod between said right-angle end portion and said shoulder.

9. The record player of claim 3, which includes a cap member which is positioned on the upper end of said right-angle end portion and is adjustable with respect thereto, adjustment of the cap member controlling the height to which said tone arm is lifted.

10. The record player of claim 3, which includes means defining an abutment at the upper end of the said inclined shoulder, which abutment limits rotary motion of said horizontal portion of said lift rod by engagement therewith.

11. The record player of claim 3, which includes support means for said tone arm, said support means also providing the said bearing for said right-angle end portion.

12. The record player of claim 11, where said inclined shoulder forms a part of said support means.

13. The record player of claim 12, wherein said biasing means comprises a spring connected between said support means and a point on the lift rod between said right-angle end portion and said shoulder.

* * * * *